US010136324B2

(12) United States Patent
Hu

(10) Patent No.: US 10,136,324 B2
(45) Date of Patent: Nov. 20, 2018

(54) METHOD AND APPARATUS FOR READING VERIFICATION INFORMATION

(71) Applicant: Beijing Qihoo Technology Company Limited, Xicheng District (CN)

(72) Inventor: Yuguang Hu, Beijing (CN)

(73) Assignee: Beijing Qihoo Technology Company Limited, Xicheng District (CN)

( * ) Notice: Subject to any disclaimer, the term of this patent is extended or adjusted under 35 U.S.C. 154(b) by 0 days.

(21) Appl. No.: 15/315,189

(22) PCT Filed: May 29, 2015

(86) PCT No.: PCT/CN2015/080323
§ 371 (c)(1),
(2) Date: Nov. 30, 2016

(87) PCT Pub. No.: WO2015/180690
PCT Pub. Date: Dec. 3, 2015

(65) Prior Publication Data
US 2017/0208470 A1 Jul. 20, 2017

(30) Foreign Application Priority Data
May 30, 2014 (CN) .......................... 2014 1 0241112

(51) Int. Cl.
G06F 17/30 (2006.01)
H04W 12/08 (2009.01)
(Continued)

(52) U.S. Cl.
CPC ............ H04W 12/08 (2013.01); G06F 21/35 (2013.01); G06F 21/56 (2013.01); H04L 9/3226 (2013.01);
(Continued)

(58) Field of Classification Search
CPC ...... H04W 12/08; H04L 63/101; G06F 21/56; G06F 2221/033
See application file for complete search history.

(56) References Cited

U.S. PATENT DOCUMENTS

| 7,865,947 B2 * | 1/2011 | Fanton | G06F 21/10 713/150 |
| 2014/0258433 A1 * | 9/2014 | Clark | H04L 51/12 709/206 |
| 2015/0135283 A1 * | 5/2015 | Tofighbakhsh | H04L 63/08 726/5 |

FOREIGN PATENT DOCUMENTS

| CN | 101827075 A | 9/2010 |
| CN | 103235915 A | 8/2013 |

(Continued)

OTHER PUBLICATIONS

International Bureau of WIPO, International Search Report and Written Opinion for Application No. PCT/CN2015/080323, dated Sep. 11, 2015.

Primary Examiner — Mohammed Waliullah
(74) Attorney, Agent, or Firm — LKGLOBAL | Lorenz & Kopf, LLP

(57) ABSTRACT

The present invention discloses a method and apparatus for controlling an application to read verification information. The method comprises: setting, in a terminal, a safe application strategy for reading a verification information, wherein the verification information is a message for verifying identity or permission of the terminal or a user in the process of executing a specific service; after the terminal receives the verification information from a network device, the application requesting to acquire the verification information; judging whether the application satisfies the safe application strategy, and according to the judging result, allowing only the application that satisfies the safe applica- (Continued)

tion strategy to read the verification information; and using the verification information for verifying identity or permission of the terminal or a user in the process of executing the specific service. the present invention, effectively preventing an illegal application from stealing the verification information and ensuring information security.

14 Claims, 2 Drawing Sheets

(51) Int. Cl.
  *G06F 21/56* (2013.01)
  *H04L 29/06* (2006.01)
  *G06F 21/35* (2013.01)
  *H04L 9/32* (2006.01)
  *H04W 12/10* (2009.01)
(52) U.S. Cl.
  CPC ............ *H04L 63/101* (2013.01); *H04L 63/12* (2013.01); *H04W 12/10* (2013.01); *G06F 2221/033* (2013.01); *H04L 2209/80* (2013.01)

(56) References Cited

FOREIGN PATENT DOCUMENTS

| CN | 103312887 A | 9/2013 |
| CN | 103327492 A | 9/2013 |
| CN | 102355667 A | 12/2015 |

\* cited by examiner

METHOD AND APPARATUS FOR READING VERIFICATION INFORMATION

CROSS-REFERENCE TO RELATED APPLICATIONS

This application is a U.S. National-Stage entry under 35 U.S.C. § 371 based on International Application No. PCT/CN2015/080323 filed May 29, 2015, which was published under PCT Article 21(2) and which claims priority to Chinese Application No. 201410241112.6 filed May 30, 2014, which are all hereby incorporated herein their entirety by reference.

TECHNICAL FIELD

This Application pertains to the field of network security technology, and more particularly, to a method and apparatus for controlling an application to read verification information.

BACKGROUND

Currently, in existing mobile service, it often requires a user to make use of verification information to operate, in order to ensure the security of the service. The user can obtain verification information via short message or e-mail and other ways. For example, when registering account or making payment with a mobile phone, it is needed to send short messages to current phone number from a server to verify user identity and short messages are sent in plain text. However now some operating systems (such as Android) are relatively open, so any software after registering short message permission can freely read the contents of short messages, causing great risks in terms of security.

In many processes of verification, especially in payment processes, mobile phone message verification is the last security measure, in which the server (a service provider, such as Alipay) sends, via short message gateway, a short message containing verification code of numbers or characters to a user's cell-phone number that has previously been bound. After the user receives the short message, the user sends the verification code to the server via the cell phone application or certified/paid WEB page. According to the verification code, the server judges whether it is the user who is verifying or paying.

The problem is that, cell phone is personal belonging, so short message is not as safe as what the service providers and the users thought. Just turn on a cell phone and look at each application installed, and one will find that many seemingly completely irrelevant applications will ask for the permission to read the short message or even send short messages. Thus, users will not care about some permissions that the installed applications have gained. A malicious application that contains Trojan horses can silently read the verification codes described previously. Under systems with version previous to Android4.4 (currently most of the Android phones on the market), Trojan horses can even delete a short message after stealing the short message that contains a verification code in the absence of the Root, and steal the verification code with the user unaware of it. In addition, other objects, desirable features and characteristics will become apparent from the subsequent summary and detailed description, and the appended claims, taken in conjunction with the accompanying drawings and this background.

SUMMARY

In view of the above problems, the present invention is to provide a method and apparatus for controlling an application to read verification information to overcome the above problems or at least partially solve them.

According to one aspect of the present invention, there is provided a method for controlling an application to read verification information, which comprises: setting, in a terminal, a safe application strategy for reading a verification information, wherein the verification information is a message for verifying identity or permission of the terminal or a user in the process of executing a specific service; after the terminal receives the verification information from a network device, the application requesting to acquire the verification information; judging whether the application satisfies the safe application strategy, and according to the judging result, allowing only the application that satisfies the safe application strategy to read the verification information; and using the verification information for verifying identity or permission of the terminal or a user in the process of executing the specific service.

According to another aspect of the present invention, there is provided an apparatus for controlling an application to read verification information, which comprises: a safe application strategy setting unit, configured to set, in a terminal, a safe application strategy for reading a verification information, wherein the verification information is a message for verifying identity or permission of the terminal or a user in the process of executing a specific service; a verification information reading requesting unit, configured to after the terminal receives the verification information from a network device, the application requesting to acquire the verification information; a safe application strategy judging unit, configured to judge whether the application satisfies the safe application strategy; a verification information reading controlling unit, configured to according to the judging result of the safe application strategy judging unit, allow only the application that satisfies the safe application strategy to read the verification information; and a service executing unit, configured to use the verification information for verifying identity or permission of the terminal or a user in the process of executing the specific service.

According to yet another aspect of the present invention, there is provided a computer program comprising computer readable codes which cause a terminal executes the method for controlling an application to read verification information described above, when said computer readable code is running on the terminal.

According to a further aspect of the present invention, there is provided a computer readable medium that stores thereon the computer program described above.

As can be seen from the above embodiments, compared with the prior art, the beneficial effects of the present invention are that: in the present invention, via pre-setting the safe application strategy, only the application which satisfies the safe application strategy is allowed to access the verification information. Thus, with regard to malicious applications such as Trojan horses, in the case that an application does not satisfy the safe application strategy, the application is not able to read the verification information, thereby effectively preventing an illegal application from stealing the verification information and ensuring information security.

The above description is only an overview of the technical solutions of the present invention. In order to understand the technical means of the present invention more clearly, and to carry out them in accordance with the description, and in order to make the aforementioned and other objects, features and advantages of the present invention more fully understood, the following specially cites specific embodiments of the present invention.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The following will describe in more detail the exemplary embodiments of the present invention with reference to the accompanying drawings. Although the accompanying drawings display the exemplary embodiments of the present invention, it should be understood that the present invention may be implemented in various forms but not limited by the embodiments set forth herein. Instead, these embodiments are provided to more thoroughly understand the present invention, and completely convey the scope of the present invention to those skilled in the art.

Figure 1:
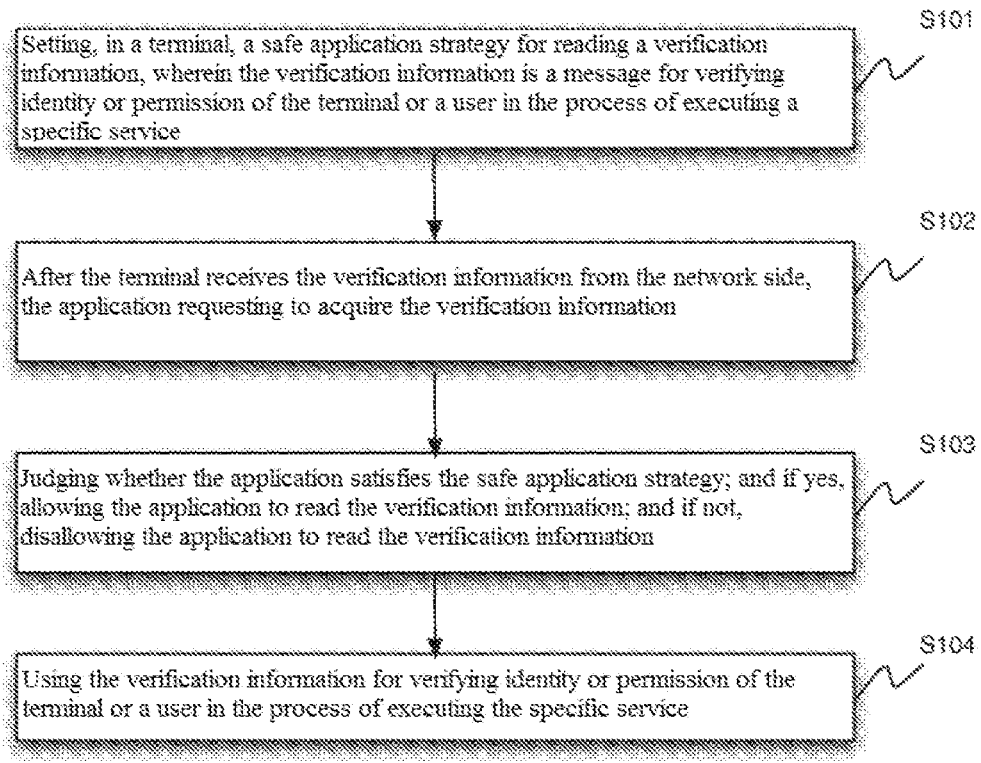
FIG. 1 shows a flow chart of a method for controlling an application to read verification information according to a non-limiting embodiment of the present invention.

As seen in FIG. 1, it is a flow chart of the method for controlling an application to read verification information provided by an embodiment of the present invention, comprising the following steps:

S101: Setting, in a terminal, a safe application strategy for reading a verification information, wherein the verification information is a message for verifying identity or permission of the terminal or a user in the process of executing a specific service;

S102: After the terminal receives the verification information from the network side, the application requesting to acquire the verification information;

S103: Judging whether the application satisfies the safe application strategy; and if yes, allowing the application to read the verification information; and if not, disallowing the application to read the verification information;

S104: Using the verification information for verifying identity or permission of the terminal or a user in the process of executing the specific service.

In the present invention, the terminal refers to a terminal having a communication function, such as smart phones. Applications include but are not limited to communication software, payment software, or e-business software, such as the currently popular Alipay software, Wechat, and so on.

Executing a specific service on an application refers to performing payment, login, download, or other services on the application after passing the verification on the identity or permission of the terminal or the user by using the verification information.

It can be understood that the verification information is a message that used to verify the identity or permission of the user or the terminal in legitimate applications, such as the verification codes or verification graphics in payment process. Verification information can be obtained in any ways, and now the common way to obtain verification information is via short messages, but the present invention is not restricted to it. It is feasible to obtain verification information through e-mail or instant messaging tool.

It can be seen that in the present invention, via pre-setting the safe application strategy, only the application which satisfies the safe application strategy is allowed to access the verification information. Thus, with regard to malicious applications such as Trojan horses, in the case that an application does not satisfy the safe application strategy, the application is not able to read the verification information, thereby effectively preventing an illegal application from stealing the verification information and ensuring information security.

For a better understanding of the present invention, "target application (target app)" can be introduced. The so-called "target app" refers to the applications that need to verify the verification information before performing the service (business). The present invention is to judge whether the application that requests reading the verification information belongs to the target application. In a particular judgment, it can be divided into two levels, wherein one is judging whether the application satisfies the safe application strategy, which is to judge the legality of the application, and the other one is judging whether the application has a permission to read a specific verification information, which is to judge the permission of the application.

There can be various methods to judge a legality of an application, depending on the pre-set safe application strategy.

For example, one safe application strategy is: forbidding all non-white applications from reading the verification information. In that, the so-called "non-white app" refers to these applications that do not belong to an application whitelist; and the application whitelist is a collection containing safe applications. The Application whitelist can be determined by the learning mechanism of practical operation. In the application whitelist, application labels can be used as identification of each application. Then, the application whitelist can be understood as a collection of the list of application labels for safe application that uses application labels as the identification of each app, wherein the application label refers to a unique identification code for identifying the identity of the application and can be queried by application products. Then, through the collection of legitimate application labels, application whitelist can be established. For example, if Alipay, Wechat, bank clients and other applications are found to be safe through learning mechanisms of practical operation, one can establish the application whitelist based on the keywords of these application labels. Then, if there is a new safe application, one can continue to add new members to the application whitelist. After determining the safe application strategy (forbidding all non-white applications from reading the verification information), the method to judge whether an application or some particular applications satisfy the safe application strategy is: judging whether the application is included in the pre-set application whitelist; and if yes, determining that the application satisfies the safe application strategy; and if not, determining that the application does not satisfy the safe application strategy. In that, the step of judging whether the application is included in the pre-set application whitelist may further comprises: judging whether the application label is included in the application label list of the application whitelist.

As another example, another safe application strategy is: forbidding all black applications from reading the verification information. In that, the so-called "black app" refers to the applications in an application blacklist; and "application blacklist" refers to a collection that contains unsafe applications (malicious applications), which is the opposite concept of the above-mentioned application whitelist. The application blacklist can be determined by the learning mechanism of practical operation. In the application blacklist, application labels can be used as identification of each application. Then, application blacklist can be understood as a collection of the list of application labels for unsafe application that uses application labels as the identification of each application. For example, if an application is found to be unsafe through learning mechanisms of practical operation, one can establish the application blacklist based on the keywords of these application labels. Then, if there is a new unsafe application, one can continue to add new members to the application blacklist. After determining the safe application strategy (forbidding all black applications from reading the verification information), the method to judge whether an application or some particular applications satisfy the safe application strategy is: judging whether the application is included in the pre-set application blacklist; and if yes, determining that the application does not satisfy the safe application strategy; and if not, determining that the application satisfies the safe application strategy. In that, the step of judging whether the application is included in the pre-set application blacklist may further comprises: judging whether the application label is included in the application label list of the application blacklist.

The embodiments of the present invention impose no restriction on the setup method of the application whitelist and application blacklist. For example, the embodiments can provide the user with a safe application strategy setting interface, and receive a safe application parameter set by the user, to generate the application whitelist and/or application blacklist; or, the application whitelist and/or application blacklist is acquired in way of configuration by a cloud server, wherein the cloud server configures the application whitelist and/or application blacklist based on sample operation and artificial intelligence method. Of course, configuration by the user and configuration by the cloud server can be combined.

The specific ways of judging permission of an application are described below.

It is judged whether the application is the one that is corresponding to the network device which provides the verification information; and if yes, it is determined that the application has the permission to read the verification information. In that the network device is a functional entity that is located on the network side and is corresponding to the verification information, and has many forms. For example, the network device may refer to an application server, a short message gateway or a proxy server of a short message gateway. Nowadays one commonly used short messages to send verification information. A person skilled in the art knows that the short message service is controlled by the operator, and then, if an application server sends a verification short message for application service to a terminal, it usually uses the operator's short message service lines. Therefore, under normal circumstances, there is need to use short message gateway or proxy server of short message gateway to send short messages. Of course it does not exclude the possibility of using application server to send verification information. A specific example is that Alipay servers intend to send verification information to mobile phones of users. A more preferred embodiment is that the Alipay server sends verification short messages to the mobile phones via short message gateway or proxy server of short message gateway, and which displays on the short message. In this step, judging the permission of the application is also judging whether the application is the corresponding application to the verification information or not. For example, only the Alipay application can read the verification short message sent from the server of Alipay, and only the WeChat application can read the verification short message sent from the server of WeChat. Specifically, by judging whether the application label is corresponding to the network device identification carried by the verification information, it can be determined whether the application is corresponding to the network device providing the verification information. For example, one can judge from the mobile phone number which sent the short message. A specific example is that if the short message is from the phone number "95559", whereby it is determined that the short message is from the server of Bank of Communications. Therefore, only the application of Bank of Communications (judging from the application label to determine whether it is the application of Bank of Communication) is allowed to read the short message.

It can be seen that in a preferred embodiment of the present invention, it is not only required to judge the legality of application, to ensure that only safe applications have the qualification to read the verification information, but also required to further judge whether the application has the permission to access specific verification information to ensure only the application corresponding to the verification information can read the verification information, which guarantees the security of information in two-level mode.

A person skilled in the art should understand that the operating system comprises an application layer (app layer) and a profile layer (framework layer), and other layers based on functional partitioning that may comprised in the operating system is not discussed in the present invention. In that, the app layer generally can be understood as an upper layer, which is responsible for interacting with the user interface, e.g., application maintenance and identifying different type of clicked content when clicking pages to display different context menu. In general, the framework layer is an intermediate layer, whose main duty is to forward the user's request obtained from the app layer, such as starting up the application, clicking on a link, clicking to save an image and the like, down to the lower level; distribute the content handled by the lower level to the higher level through messages, or intermediate proxy class, and show to the user.

A preferred embodiment of the present invention is to improve the application layer to achieve controlling an application to read verification information in the intelligent terminal. Specially, one can add a monitoring module in the app layer (for example, adding a function in a safe application), for monitoring the behavior of the application reading the verification information, to judge whether the application satisfies the security strategy or not before the application requests to read the verification information. If it satisfies the security strategy, the application is allowed to read the verification information; and if not, the application is disallowed to read the verification information.

In that, the monitoring module can use Hook mechanism for monitoring. The Hook mechanism allows an application to intercept processed messages or specific events. Hook is actually a program segment that processes messages, which is hung into the system through system call. Whenever a particular message is sent, before it arrives at the destination window, the Hook program firstly catches the message, that is, the Hook function firstly gets the mastery. Then, the Hook function can process (change) the message and it can also not process but pass on the message. It can also end the delivery of the message by force. In the embodiment example of the present invention, Hook mechanism is used to interrupt the application directly reading the verification information, and the step of judging safe application strategy is inserted, in order to ensure that only the applications that are legal and have permission can read the verification information.

Figure 2:
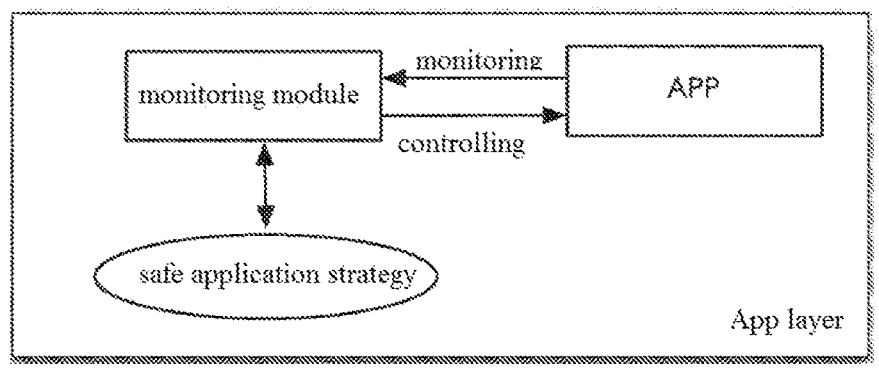
FIG. 2 shows a schematic diagram of a method for controlling an application to read verification information according to a non-limiting embodiment of the present invention.

As seen in FIG. 2, it shows a flow chart of the method for controlling an application to read verification information according to the present invention. In that, the monitoring module is a newly added function module in the app layer, which is for monitoring the behavior of the application reading the verification information. After the behavior is monitored, it interrupts the behavior, and judges whether the application satisfies the safe application strategy, including judging the legality of the application and whether the application has permission to read the verification information. If the application satisfies the strategy, the application is allowed to read the verification information; and if not, the application is prohibited to read the verification information. It can be seen that, by adding the monitoring module to control the behavior of application reading the verification information, one can ensure that only the qualified legal application with access permission can read the verification information, thereby effectively preventing malicious application (Trojan horses) to steal sensitive information and ensuring information security.

Corresponding to the above-described method, the present invention also provides an apparatus for controlling an application to read verification information. The apparatus can be implemented by hardware, software, or the combination of hardware and software. The apparatus may refer to an internal function module in a terminal, or refer to the terminal itself, as long as the terminal comprises the function to realize the apparatus.

Figure 3:
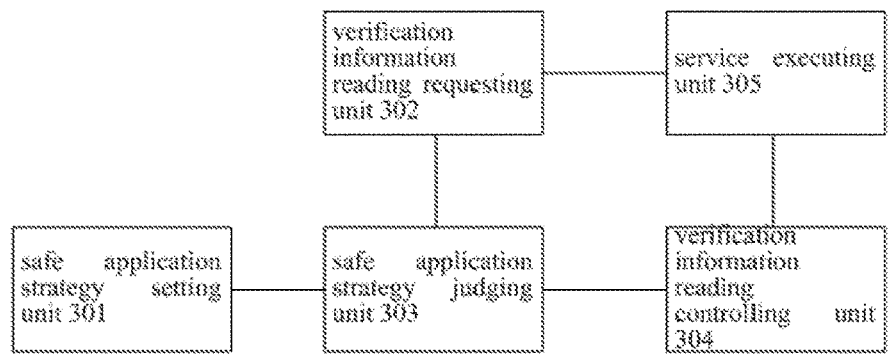
FIG. 3 shows a structural schematic diagram of an apparatus for controlling an application to read verification information according to a non-limiting embodiment of the present invention.

As shown in FIG. 3, the apparatus comprises:

a security application strategy setting unit 301, which is configured to set, in a terminal, a safe application strategy for reading a verification information, wherein the verification information is a message for verifying identity or permission of the terminal or a user in the process of executing a specific service;

a verification information reading requesting unit 302, which is configured to after the terminal receives the verification information from a network device, the application requesting to acquire the verification information;

a safe application strategy judging unit 303, which is configured to judge whether the application satisfies the safe application strategy;

a verification information reading controlling unit 304, which is configured to, according to the judging result of the safe application strategy judging unit 303, allow only the application that satisfies the safe application strategy to read the verification information; and a service executing unit 305, which is configured to use the verification information for verifying identity or permission of the terminal or a user in the process of executing the specific service.

Preferably, the safe application strategy judging unit comprises an application legality judging sub-unit for judging whether the application is legal or not.

One method to judge the legality of an application is that the safe application strategy set by the safe application strategy setting unit 301 comprises forbidding all non-white applications from reading the verification information; and the application legality judging sub-unit is in particular configured to: judge whether the application is included in a pre-set application whitelist; and if yes, determine the application as legal.

Another method to judge the legality of an application is that the safe application strategy set by the safe application strategy setting unit comprises forbidding all black applications from reading the verification information; and the application legality judging sub-unit is in particular configured to: judge whether the application is included in a pre-set application blacklist; and if not, determine the application as legal.

In that, the application whitelist or application blacklist refers to an application label list which uses application label as the identity of each application; and the application legality judging sub-unit is in particular further configured to: judge whether the application label is included in the application label list of the application whitelist or application blacklist.

Preferably, the safe application strategy setting unit 301 is also configured to provide the user with a safe application strategy setting interface, receive a safe application parameter set by the user, and generate the application whitelist and/or application blacklist; or, the safe application strategy setting unit 301 is configured to acquire the application whitelist and/or application blacklist in way of configuration by a cloud server, wherein the cloud server configures the application whitelist and/or application blacklist based on sample operation and artificial intelligence.

Preferably, the safe application strategy judging unit 303 further comprises:

an application permission judging sub-unit, which is configured to judge whether the application has a permission to read the verification information.

In that, the application permission judging sub-unit is in particular configured to: judge whether the application is an application that is corresponding to the network device which provides the verification information; and if yes, determine that the application has the permission to read the verification information.

Further, the application permission judging sub-unit is in particular configured to: judge whether the application label is corresponding to a network device label carried by the verification information, wherein the application label refers to the unique identification code for identifying the identity of the app.

In that, the network device refers to a server, a gateway or a proxy server that sends verification information for a target app.

In that, the terminal receives the verification information from the network device by communication modes such as short message, email or instant messaging tool.

It should be noted that:

The algorithm and display provided herein are not inherently related to any particular computer, virtual devices or other devices. Various general devices may be used in conjunction with the teachings based on the disclosure. According to the above description, the structure required to configure such devices is obvious. Furthermore, the present invention is not directed against any particular programming language. It should be understood that a variety of programming languages could be used for realizing the contents of the present invention described herein, and the above description of a particular language aims to demonstrate the preferred embodiments of the present invention.

In the description provided herein, numerous specific details are described. However, it can be understood that the embodiments of the present invention may be practiced without these specific details. In some practical instances, well-known methods, structures and techniques are not shown in detail, in order not to obscure the understanding of this description.

Similarly, it should be understood that, in order to simplify the disclosure and to facilitate the understanding of one or more of various aspects thereof, in the above description of the exemplary embodiments of the disclosure, various features of the present invention may sometimes be grouped together into a single embodiment, accompanying FIG. or description thereof. However, the method of this disclosure should not be constructed as follows: the present invention for which the protection is sought specifies more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims may be considered as a separate embodiment of the present invention.

It should be understood by those skilled in the art that modules of the device in the embodiments may be adaptively modified and arranged in one or more devices different from the embodiment. Modules, units or components in the embodiment may be combined into one module, unit or component, and also may be divided into more sub-modules, sub-units or sub-components. Except that at least some of features and/or processes or units are mutually exclusive, various combinations may be used to combine all the features disclosed in specification (including claims, abstract and accompanying drawings) and all the processes or units of any methods or devices as disclosed herein. Unless otherwise definitely stated, each of features disclosed in specification (including claims, abstract and accompanying drawings) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the present invention and forms the different embodiment. For example, in the claims, any one of the embodiments for which the protection is sought may be used in any combination manner.

Each of devices according to the embodiments of the present invention may be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the present invention. The present invention may further be implemented as device program (for example, computer program and computer program product) for executing some or all of the methods as described herein. Such program for implementing the present invention may be stored in the computer readable medium, or have a form of one or more signals. Such a signal may be downloaded from the internet websites, or be provided in carrier, or be provided in other manners.

Figure 4:
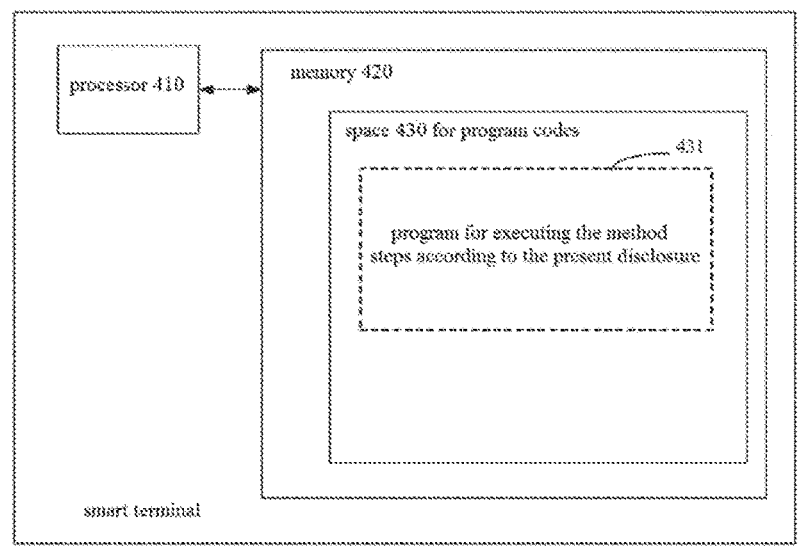
FIG. 4 shows a block diagram of a non-limiting embodiment of a terminal for executing the method for controlling an application to read verification information according to the present invention.
Figure 5:
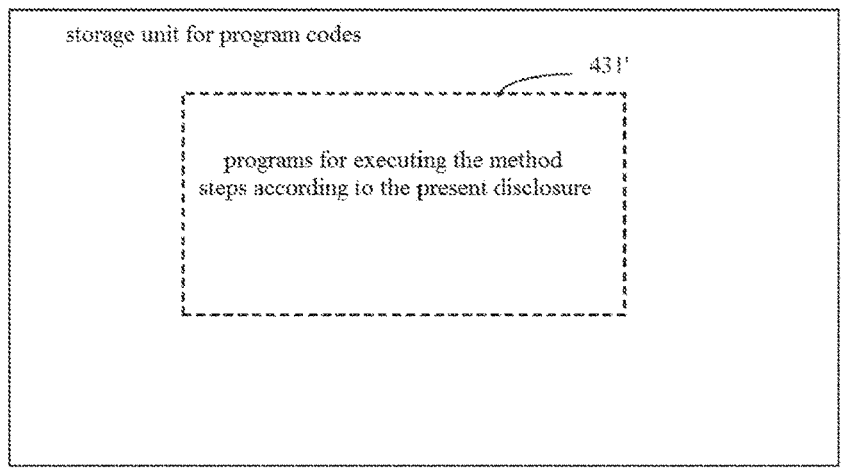
FIG. 5 shows a non-limiting embodiment of a storage unit for maintaining or carrying the program code for implementing the method for controlling an application to read verification information according to the present invention.

For example, FIG. 4 shows a terminal that can control an application to read verification information in accordance with the present invention, such as a smart terminal. The terminal traditionally comprises a processor 410 and a computer program product or computer readable medium in form of a memory 420. The memory 420 could be electronic memories like flash memory, EEPROM (Electrically Erasable Programmable Read Only Memory), EPROM, hard disk or ROM. The memory 420 has the storage space 430 for the program code 431 executing any steps of the above-described method. For example, the storage space 430 for program code could comprise program codes 431 for respectively implementing each of the steps of the above methods. The program codes may be read from or be written into one or more computer program products. These computer program products comprise program code carriers like hardware, compact disk (CD), memory card or floppy disk. Such computer program products are usually the typically portable or fixed storage unit as showed in FIG. 5. The storage unit may have storage segments, storage space, etc., with similar arrangement with the memory 420 of the terminal shown in FIG. 4. The program code may be compressed in a suitable form. Generally, the storage unit comprises a computer readable code 431', which can be read by a processor like the processor 410. When the code is running on the terminal, the terminal is caused to execute respective steps of the method described above.

It should be noted that the above-described embodiments are intended to illustrate but not to limit the present invention, and alternative embodiments may be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings may be interpreted as a name.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for controlling an application to read verification information, comprising:
   setting, in a terminal, a safe application strategy for reading a verification information, wherein the safe application strategy includes forbidding all non-white applications from reading the verification information, wherein the non-white applications refer to applications except white applications and wherein the verification information is a message for verifying identity or permission of the terminal or a user in the process of executing a specific service;
   after the terminal receives the verification information from a network device, the application requesting to acquire the verification information;
   judging whether the application satisfies the safe application strategy, and according to the judging result, allowing only the application that satisfies the safe application strategy to read the verification information, wherein judging whether the application is legal or not, comprises:
      judging whether the application is included in a pre-set application whitelist; and if yes, determining the application as legal;
      or,
      the safe application strategy comprises forbidding all black applications from reading the verification information; and
      the judging whether the application is legal or not comprises:
      judging whether the application is included in a pre-set application blacklist; and if not, determining the application as legal;
      wherein the application whitelist and/or application blacklist is acquired in way of configuration by a cloud server, wherein the cloud server configures the application whitelist and/or application blacklist based on sample operation and artificial intelligence; and
   using the verification information for verifying identity or permission of the terminal or a user in the process of executing the specific service.

2. The method according to claim 1, wherein, the application whitelist or application blacklist refers to an application label list which uses application label as the identity of each application; and
   the judging whether the application is included in a pre-set application whitelist or application blacklist comprises:
   judging whether the application label is included in the application label list of the application whitelist or application blacklist.

3. The method according to claim 1, further comprising:
   providing the user with a safe application strategy setting interface; and
   receiving a safe application parameter set by the user and generating the application whitelist and/or application blacklist.

4. The method according to claim 1, wherein, the judging whether the application satisfies the safe application strategy further comprises:
   judging whether the application has the permission to read the verification information, besides the judging whether the application is legal or not.

5. The method according to claim 4, wherein, the judging whether the application has the permission to read the verification information comprises:
   judging whether the application is an application that is corresponding to the network device which provides the verification information; and if yes, determining that the application has the permission to read the verification information.

6. The method according to claim 5, wherein, the judging whether the application is an application that is corresponding to the network device which provides the verification information comprises:
   judging whether the application label is corresponding to a network device label carried by the verification information; and if yes, determining that the application is corresponding to the network device which provides the verification information.

7. An apparatus comprising a memory having instructions stored thereon and at least one processor to execute the instructions to perform operations for controlling an application to read verification information, the operations comprising:
   setting, in a terminal, a safe application strategy for reading a verification information, wherein the safe application strategy includes forbidding all non-white applications from reading the verification information, wherein the non-white applications refer to applications except white applications and wherein the verification information is a message for verifying identity or permission of the terminal or a user in the process of executing a specific service, wherein the setting comprises acquiring an application whitelist and/or an application blacklist in way of configuration by a cloud server, wherein the cloud server configures the application whitelist and/or application blacklist based on sample operation and artificial intelligence;
   after the terminal receives the verification information from a network device, the application requests to acquire the verification information;
   judging whether the application satisfies the safe application strategy by judging whether the application is legal or not, comprising;
      judging whether the application is included in the pre-set application whitelist; and if yes, determining the application as legal;
      or,
      the safe application strategy comprises: forbidding all black applications from reading the verification information; and
      the judging whether the application is legal or not comprises:
      judging whether the application is included in the pre-set application blacklist and if not, determining the application as legal;
   according to the judging result, allowing only the application that satisfies the safe application strategy to read the verification information; and using the verification information for verifying identity or permission of the terminal or a user in the process of executing the specific service.

8. The apparatus according to claim 7, wherein, the application whitelist or application blacklist refers to an application label list which uses application label as the identity of each application; and the judging whether the application is legal or not further comprises:

judging whether the application label is included in the application label list of the application whitelist or application blacklist.

9. The apparatus according to claim 7, wherein, the setting a safe application strategy to read a verification information in a terminal comprises:

providing the user with a safe application strategy setting interface, receiving a safe application parameter set by the user, and generating the application whitelist and/or application blacklist.

10. The apparatus according to claim 7, wherein, the judging whether the application satisfies the safe application strategy further comprises: judging whether the application has the permission to read the verification information.

11. The apparatus according to claim 10, wherein, the judging whether the application has the permission to read the verification information comprises:

judging whether the application is an application that is corresponding to the network device which provides the verification information; and if yes, determining that the application has the permission to read the verification information.

12. The apparatus according to claim 11, wherein, the judging whether the application has the permission to read the verification information comprises:

judging whether the application label is corresponding to a network device label carried by the verification information.

13. The apparatus according to claim 7, wherein, the terminal receives the verification information from the network device by communication modes of short message, email or instant messaging tool.

14. A non-transitory computer readable storage media, having instructions stored thereon that, when executed by at least one processor, cause the at least one processor to perform operations for controlling an application to read verification information, the operations comprising:

setting, in a terminal, a safe application strategy for reading a verification information, wherein the safe application strategy includes forbidding all non-white applications from reading the verification information, wherein the non-white applications refer to applications except white applications and wherein the verification information is a message for verifying identity or permission of the terminal or a user in the process of executing a specific service;

after the terminal receives the verification information from a network device, the application requests to acquire the verification information;

judging whether the application satisfies the safe application strategy, and according to the judging result, allowing only the application that satisfies the safe application strategy to read the verification information, wherein judging whether the application is legal or not, comprises:

judging whether the application is included in a pre-set application whitelist; and if yes, determining the application as legal;

or, the safe application strategy comprises forbidding all black applications from reading the verification information; and the judging whether the application is legal or not comprises:

judging whether the application is included in a pre-set application blacklist; and if not, determining the application as legal;

wherein the application whitelist and/or application blacklist is acquired in way of configuration by a cloud server, wherein the cloud server configures the application whitelist and/or application blacklist based on sample operation and artificial intelligence; and using the verification information for verifying identity or permission of the terminal or a user in the process of executing the specific service.

\* \* \* \* \*